UNITED STATES PATENT OFFICE.

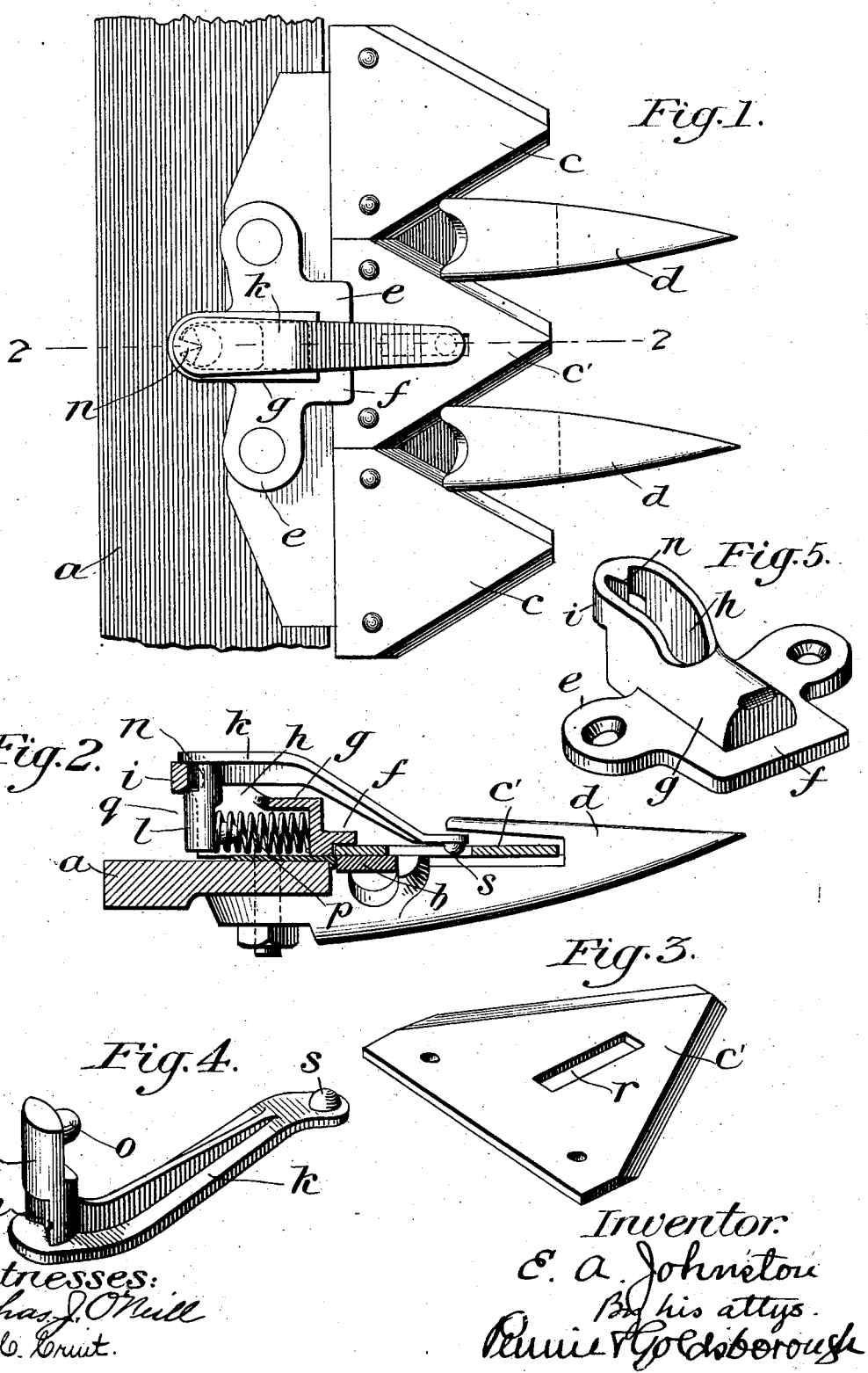

EDWARD A. JOHNSTON, OF CHICAGO, ILLINOIS, ASSIGNOR TO McCORMICK HARVESTING MACHINE COMPANY, OF CHICAGO, ILLINOIS.

CUTTING APPARATUS FOR MOWERS, REAPERS, OR THE LIKE.

SPECIFICATION forming part of Letters Patent No. 708,146, dated September 2, 1902.

Application filed July 10, 1902. Serial No. 115,021. (No model.)

*To all whom it may concern:*

Be it known that I, EDWARD A. JOHNSTON, a citizen of the United States, residing at Chicago, county of Cook, State of Illinois, have invented certain new and useful Improvements in Cutting Apparatus for Mowers, Reapers, or the Like; and I do hereby declare the following to be a full, clear, and exact description of the invention, such as will enable others skilled in the art to which it appertains to make and use the same.

The invention relates to the means for holding the cutters of mowers, reapers, and the like down upon the plates of the guard-fingers; and it consists in an improved form of clip that is secured to the finger-bar in the ordinary manner and has a pivoted finger which overhangs the cutters and has its front end depressed by a spring, so as to exert a downward pressure upon the cutters at a point beyond their attachment to the cutter-bar.

The invention is illustrated in the accompanying drawings, wherein—

Figure 1 is a plan of a portion of a finger-bar, showing one of my clips in place. Fig. 2 is a cross-section on the line 2 2. Fig. 3 is a perspective of one of the cutters to which the clips are applied. Fig. 4 is a perspective of the finger, the same being turned over to better show the construction; and Fig. 5 is a perspective view of the socket for holding the clip.

Referring to the views, $a$ denotes the finger-bar, $b$ the cutter-bar, $c$ the cutters, $d$ the guard-fingers, and $e$ the base-plate, of the clip. Except the base-plate these parts are all of the usual construction and arrangement, and the plate itself is bolted to the finger-bar in the ordinary manner and has the usual lip $f$, overhanging the rear edge of the cutters. About centrally of its length this base-plate has a raised socket $g$, extending in a fore-and-aft direction, as shown in Figs. 1 and 2. The top of the socket at the rear is open, as indicated at $h$; but the rear end at the upper part is closed by a continuation $i$ of the side wall extending around behind.

The finger of the clip is represented at $k$. It has a downwardly-extending pin $l$ at its rear end, which forms a pivot for it to turn on in the socket of the base-plate, and the forward part of the finger inclines downward and bears at its point on the cutter $c'$ near its forward end, where the force tending to lift it from the leger-plate is greatest.

The pivot-pin $l$ is formed with a V-shaped recess $m$ at its upper end on the rear side, and the rear wall $i$ of the socket has a knife-edged projection $n$, which when the finger is in place fits into the recess $m$ and constitutes the pivotal point on which the finger vibrates. On its front side, at the lower end, the pin $l$ has a lug $o$, and between this lug and the forward end of the socket a coiled spring $p$, that is housed in the socket, reacts, so as to tend constantly to force the lower end of the pin backward, thereby causing the front end of the finger itself to bear downward with an elastic pressure on the cutter. The rear side of the socket $g$ being open, as shown at $q$, Fig. 2, permits the finger as a whole to rock in a vertical fore-and-aft plane on the part $i$ as a fulcrum under the action of this spring, and the knife-edged projection $n$, already described, permits the finger to oscillate in a horizontal plane, so that its point may follow the reciprocating movement of the cutter $c'$.

It will be understood that the finger is oscillated by the cutter, and the necessary engagement between its forward end and the cutter is made as represented in Figs. 2 and 3, where $r$ denotes a slot in the center of the cutter extending toward its point, and $s$ indicates a lug on the under side of the point of the finger which extends into the slot. The spring-pressure on the finger holds this projection in the slot, and the elongation of the latter provides for the necessary play of the projection that is incident to the differential movement between the finger and the cutter.

The construction being as thus described it will be noted that there is no spring, as such, bearing directly on the cutter and no spring which is pivoted in the socket or to the base-plate. It will also be noted that the finger is, in effect, a rigid bell-crank lever, one arm of which bears downward on the cutter and the other arm of which is pressed rearwardly by the spring. The arrangement of the spring is particularly advantageous, inasmuch as it is entirely concealed and protected and is, moreover, connected to the finger in a way to offer the least possible resistance to its oscillating movement.

Having thus described the invention, what I claim is—

1. A spring-clip for the cutting apparatus of mowers, reapers, and the like, comprising a rigid finger extending forward over the cutter and free to oscillate therewith, and a spring holding said finger down with an elastic pressure on the cutter.

2. A spring-clip for the cutting apparatus of mowers, reapers, and the like, comprising a rigid spring-pressed finger that is free to oscillate on a vertical pivot, combined with a spring which causes the finger to tilt on a horizontal fulcrum and presses its front end elastically down on the cutter.

3. A spring-clip for the cutting apparatus of mowers, reapers, and the like, comprising a rigid bell-crank-shaped finger that is pivoted horizontally and vertically by one of its arms and has its other arm extending forward over the cutter, combined with a spring which acts on the first-mentioned arm to hold the forwardly-extending arm elastically down on the cutter.

4. A spring-clip for the cutting apparatus of mowers, reapers, and the like, comprising a rigid, pivoted, spring-pressed finger overhanging the cutter and having a lug on the under side of its front end, combined with a cutter having a fore-and-aft slot into which the lug extends and in which it plays as the cutter and finger reciprocate.

5. A spring-clip for the cutting apparatus of mowers, reapers, and the like, comprising a rigid finger $k$ having a pivot $l$ with a V-shaped recess in the rear side at the upper end, a socket $g$ having a knife-edged projection $n$ at its upper rear side, and a spring $p$ inclosed in the socket and reacting against the lower end of the pivot $l$.

6. A spring-clip for the cutting apparatus of mowers, reapers, and the like, comprising a rigid finger $k$, having a pivot $l$ with a V-shaped recess $m$ in the rear side at the upper end, a socket $g$ having a rear wall $i$ with a knife-edged vertical projection $n$, and a spring $p$ inclosed in the socket and reacting against the lower end of the pivot $l$, the forward end of the finger having a projection on its under side to engage a slot in the cutter.

In testimony whereof I affix my signature in presence of two witnesses.

EDWARD A. JOHNSTON.

Witnesses:
CHAS. N. CHAMBERS,
CHAS. W. ALLEN.